(12) United States Patent
Liu et al.

(10) Patent No.: US 12,427,938 B2
(45) Date of Patent: Sep. 30, 2025

(54) VEHICLE SUNROOF COMPRISING ENERGIZED SUNROOF GLASS, AND VEHICLE

(71) Applicant: Webasto SE, Stockdorf (DE)

(72) Inventors: Xiong Liu, Shanghai (CN); Jerry Hu, Shanghai (CN); Daniel Schuller, Shanghai (CN); Zhu Sulzer, Shanghai (CN)

(73) Assignee: WEBASTO SE, Stockdorf (DE)

( * ) Notice: Subject to any disclaimer, the term of this patent is extended or adjusted under 35 U.S.C. 154(b) by 285 days.

(21) Appl. No.: 17/802,821

(22) PCT Filed: Feb. 25, 2021

(86) PCT No.: PCT/IB2021/000151
§ 371 (c)(1),
(2) Date: Aug. 26, 2022

(87) PCT Pub. No.: WO2021/171098
PCT Pub. Date: Sep. 2, 2021

(65) Prior Publication Data
US 2023/0087203 A1 Mar. 23, 2023

(30) Foreign Application Priority Data
Feb. 28, 2020 (CN) .......................... 202010129809.X

(51) Int. Cl.
*B60R 16/027* (2006.01)
*B60J 7/04* (2006.01)
(Continued)

(52) U.S. Cl.
CPC ............... *B60R 16/027* (2013.01); *B60J 7/04* (2013.01); *B60Q 3/208* (2017.02); *B60Q 3/74* (2017.02); *B60R 16/0215* (2013.01)

(58) Field of Classification Search
CPC ....... B60R 6/02; B60R 6/0207; B60R 6/0215; H02G 3/0437; H01B 7/40; H01B 7/0045
See application file for complete search history.

(56) References Cited

U.S. PATENT DOCUMENTS 3,876,862 A * 4/1975 Newman .................. H05B 3/00
219/203
5,084,594 A * 1/1992 Cady .................... H01B 7/0861
174/117 M
(Continued)

FOREIGN PATENT DOCUMENTS

DE    19527740 C1    12/1996
DE    19650227 C1    11/1997
(Continued)

OTHER PUBLICATIONS

PCT International Search Report and Written Opinion, PCT/IB2021/000151, Jul. 15, 2021, 15 pages.

*Primary Examiner* — Paresh Paghadal
(74) *Attorney, Agent, or Firm* — Quarles & Brady LLP

(57) ABSTRACT

The present disclosure relates to a vehicle sunroof comprising an energized sunroof glass, and to a vehicle. The energized sunroof glass comprises a rear glass and a front glass (1) being slidable relative to the rear glass. The vehicle sunroof further comprises a movable wire harness (6), one end of the movable wire harness (6) is electrically connected to the front glass (1), and the other end of the movable wire harness (6) is electrically connected to a main wire harness of the vehicle sunroof. A hard guiding member (6d) is disposed inside the movable wire harness (6) and penetrates through at least part of the length of the movable wire harness (6) to guide the movable wire harness (6) to be rolled up or spread when the from glass (1) slides. The movable wire harness connection structure of the vehicle sunroof is small in size, and has fewer components but high (Continued)

integration. Further, the movable wire harness is not easy to get tangled and has a good self-guiding function during operation of the sunroof.

7 Claims, 3 Drawing Sheets

(51) Int. Cl.
*B60Q 3/208* (2017.01)
*B60Q 3/74* (2017.01)
*B60R 16/02* (2006.01)

(56) References Cited

U.S. PATENT DOCUMENTS

| | | | | |
|---|---|---|---|---|
| 5,235,132 | A * | 8/1993 | Ainsworth | H01B 7/0861 174/117 FF |
| 5,446,239 | A * | 8/1995 | Mizutani | H01B 7/0838 174/117 FF |
| 5,552,565 | A * | 9/1996 | Cartier | H01B 7/0892 174/117 FF |
| 6,161,894 | A * | 12/2000 | Chapman | B60J 5/06 439/162 |
| 6,323,428 | B1 * | 11/2001 | Takano | B60R 16/0215 248/51 |
| 6,340,199 | B1 * | 1/2002 | Fukumoto | E05F 15/44 296/155 |
| 10,202,087 | B2 * | 2/2019 | Tomosada | B60R 16/027 |
| 10,319,976 | B2 * | 6/2019 | Sato | H01M 50/50 |
| 10,556,538 | B2 * | 2/2020 | Mersch | B60Q 3/51 |
| 10,587,106 | B1 * | 3/2020 | Sato | H02G 11/006 |
| 10,717,399 | B2 * | 7/2020 | Kogure | B60R 16/0215 |
| 2004/0012951 | A1 * | 1/2004 | Pylkki | G08B 7/062 362/276 |
| 2009/0243344 | A1 * | 10/2009 | Clephas | B60J 7/05 296/213 |
| 2010/0103672 | A1 * | 4/2010 | Thomas | F21S 4/28 362/235 |
| 2010/0146859 | A1 * | 6/2010 | Gipson | E05F 15/632 49/348 |
| 2011/0147078 | A1 * | 6/2011 | Satou | B60R 16/027 174/72 A |
| 2011/0175392 | A1 | 7/2011 | Yamamoto et al. | |
| 2015/0130225 | A1 * | 5/2015 | Sawada | B60J 7/0435 296/216.03 |
| 2016/0186964 | A1 * | 6/2016 | May | F21S 2/00 362/218 |
| 2016/0248371 | A1 | 8/2016 | Eo et al. | |
| 2016/0258581 | A1 * | 9/2016 | May | F21K 9/272 |
| 2017/0072836 | A1 * | 3/2017 | Fay | H05B 45/50 |
| 2017/0274846 | A1 * | 9/2017 | Katsuramaki | B60R 16/027 |
| 2018/0227986 | A1 * | 8/2018 | Snider | H05B 3/86 |
| 2019/0232897 | A1 * | 8/2019 | Tomosada | B60R 16/0215 |
| 2020/0139907 | A1 * | 5/2020 | Sano | B60N 2/0715 |
| 2020/0231086 | A1 * | 7/2020 | Nakajima | B60Q 1/268 |
| 2021/0129747 | A1 * | 5/2021 | Roeber | B60Q 1/2611 |
| 2022/0212614 | A1 * | 7/2022 | Sumida | B60R 16/0215 |
| 2022/0251835 | A1 * | 8/2022 | Vervisch | E04F 10/10 |

FOREIGN PATENT DOCUMENTS

| | | |
|---|---|---|
| DE | 10110191 A1 | 9/2002 |
| DE | 102018211486 A1 | 6/2019 |
| EP | 2320533 A1 | 5/2011 |
| WO | 2019188811 A1 | 10/2019 |

* cited by examiner

VEHICLE SUNROOF COMPRISING ENERGIZED SUNROOF GLASS, AND VEHICLE

CROSS-REFERENCE TO RELATED APPLICATIONS

The present application is a national stage application filed under 35 U.S.C. § 371 of International Application No. PCT/IB2021/000151, filed Feb. 25, 2021, which claims priority to Chinese Patent Application No. 202010129809.X, filed Feb. 28, 2020. Each of the aforementioned Patent Applications is incorporated by reference in its entirety for all purposes.

FIELD

The present disclosure relates to the field of vehicle sunroofs and, more particularly, to a vehicle sunroof comprising energized sunroof glass. The present disclosure further relates to a vehicle comprising this vehicle sunroof.

BACKGROUND

At present, most domestic vehicles are installed with an openable transparent sunroof for ventilation, lighting and heat dissipation. These openable transparent sunroofs often include a sunroof frame, a front glass and a rear glass. The front glass is mounted at the front of the sunroof frame and capable of sliding backwards, and the rear glass is mounted at the rear of the sunroof frame. The rear glass is fixably mounted at the rear of the sunroof frame, or configured to be inclined at a predetermined angle relative to the vehicle body, i.e. can be tilted.

In some vehicle models, the front glass and the rear glass use energized glasses so that these sunroof glasses can help to realize diversified auxiliary functions and meet the increasingly high expectation for driving experience. For example, atmosphere lights can be mounted on sunroof glass for illumination of the sunroof glass so that other colors can be added to the transparent sunroof glass to improve the visual sensory effects of the sunroof glass. Again for example, both the front glass and the rear glass use dimming glasses whose properties can be changed by applying a voltage thereto, so as to switch between transparent effects and shading effects. Yet again for example, both the front glass and the rear glass use solar glasses that are capable of providing electrical energy to the vehicle through the solar batteries disposed therein.

For these energized front glasses, the structure of their control circuits usually includes movable harness structure and fixed position contact structure.

FIG. 1 is a partially exploded schematic view of a prior art vehicle sunroof comprising energized sunroof glass, the control circuit of the energized front glass 1 of the vehicle sunroof using a movable harness structure. FIG. 2 is an enlarged schematic view of the vehicle sunroof in FIG. 1 at the movable harness connection.

As shown in FIGS. 1 and 2, the front glass 1 of the vehicle sunroof is provided with an atmosphere light system mounted thereon, the atmosphere light system comprising LED (light-emitting diode) light strips mounted along two side edges of the front glass 1 and atmosphere light shades 2 configured to cover the LED light strips, the atmosphere light shade 2 being provided with a connector assembly mounted thereon. More specifically, the connector assembly includes a socket outlet retainer 31 mounted on the atmosphere light shade 2 and configured to be connected to the movable wire harness 4 and a socket outlet mounted on the socket outlet retainer 31, the socket outlet is provided with an electrical connector 32 disposed therein and configured to electrically connect the movable wire harness 4 to the LED light strip. Further, the connector assembly includes a protective cover 33 configured to cover the socket outlet retainer 31 and the electrical connector 32.

A plug 41 disposed at the glass end of the movable wire harness 4 is configured to be inserted into the socket outlet of the connector assembly, while a power supply terminal plug 42 is configured to be connected to a main wire harness 44 of the sunroof. When the front glass 1 moves between the closed position and the open position, the movable wire harness 4 is rolled up or spread along with the movement of the front glass 1, so that the front glass 1 remains electrically connected during the entire process of opening and closing to realize atmosphere lighting effects. A hard harness sleeve 43 is disposed on a section of the movable wire harness 4 proximal to the plug 41 at the glass end thereof so as to protect, guide the movable wire harness 4 and reduce noise.

However, the flaws of this type of vehicle sunroofs lie in: the connector assembly on the atmosphere shade 2, the movable wire harness 4 and its glass end socket outlet 41, power supply terminal plug 42 and hard harness sleeve 43 are relatively large in size and difficult to be arranged in a small space.

SUMMARY OF THE DISCLOSURE

The present disclosure aims to overcome the deficiencies of prior art by providing a novel vehicle sunroof comprising energized sunroof glass and a vehicle comprising this novel vehicle sunroof. The movable wire harness structure of the vehicle sunroof is small in size, and has fewer components but high integration. Further, the movable wire harness is not easy to get tangled and has a good self-guiding function during operation of the sunroof.

To this end, a first aspect of the present disclosure provides a vehicle sunroof comprising energized sunroof glass. The energized sunroof glass comprises a rear glass and a front glass being slidable relative to the rear glass. The vehicle sunroof further comprises a movable wire harness, one end of the movable wire harness is electrically connected to the front glass, and the other end of the movable wire harness is electrically connected to a main wire harness of the vehicle sunroof. A hard guiding member is disposed inside the movable wire harness and penetrates through at least part of the length of the movable wire harness to guide the movable wire harness to be rolled up or spread when the front glass slides.

According to a preferred embodiment of the present disclosure, the hard guiding member penetrates through the entire length of the movable wire harness.

According to a preferred embodiment of the present disclosure, the hard guiding member is a metal sheet or hard plastic sheet.

According to a preferred embodiment of the present disclosure, the movable wire harness has a rectangular cross-section and the plurality of wires are arranged on one side of the hard guiding member.

According to a preferred embodiment of the present disclosure, the energized sunroof glass is a sunroof glass with an atmosphere light system, the atmosphere light system comprising LED (light-emitting diode) light strips mounted along the edges of the front glass and atmosphere light shades configured to cover the LED light strips, the atmosphere light shade being provided with a socket outlet configured to electrically connect the light strip and the movable wire harness.

According to a preferred embodiment of the present disclosure, the socket outlet and the atmosphere light shade are integrally formed.

According to a preferred embodiment of the present disclosure, the energized sunroof glass is dimming glass or solar glass.

A second aspect of the present disclosure provides a vehicle that comprises the vehicle sunroof comprising energized sunroof glass according to the first aspect of the present disclosure.

Compared to the prior art, the vehicle sunroof comprising energized sunroof glass has many advantages, in particular:

(1) Disposing a hard guiding member inside the movable wire harness and preferably penetrating through the entire length of the movable wire harness not only reduces the sizes of the movable wire harness and the socket outlet thereof, but also optimize the strength of the movable wire harness without the provision of a harness sleeve, thereby achieving a good self-guiding function so that the movable wire harness is not prone to breaking or getting tangled;

(2) The cross-section of the movable wire harness has a greater length to width ratio, therefore the torsional rigidity of the movable wire harness is optimized;

(3) The connector assembly has fewer components but high integration;

(4) The movable wire harness structure is low-cost, convenient to manufacture, therefore this type of vehicle sunroofs is widely used in various vehicle models.

BRIEF DESCRIPTION OF THE DRAWINGS

Other features and advantages of the present disclosure will be better understood through the detailed description below with reference to the accompanying drawings and preferred embodiments. In the drawings, identical numerals denote the same or similar components.

DETAILED DESCRIPTION

The implementation and use of the preferred embodiments are described below in detail. It must be noted, however, that the embodiments are intended to exemplarily illustrate specific ways of implementing and using the present disclosure and not to limit the scope of protection thereof.

Figure 1:
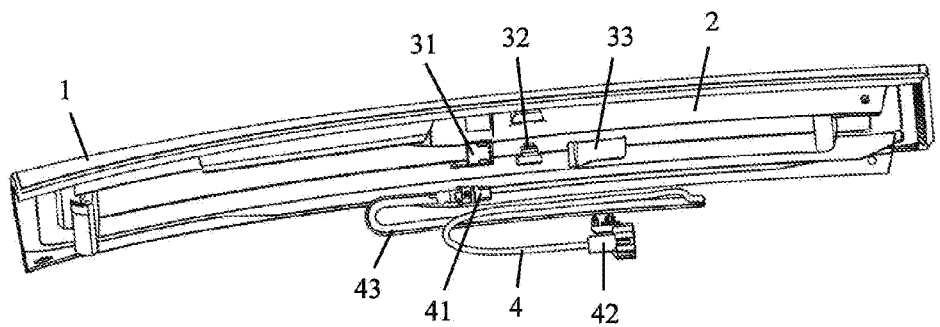
FIG. 1 is a partially exploded schematic view of a prior art vehicle sunroof comprising energized sunroof glass, the control circuit of the energized front glass of the vehicle sunroof using a movable harness structure.
Figure 2:
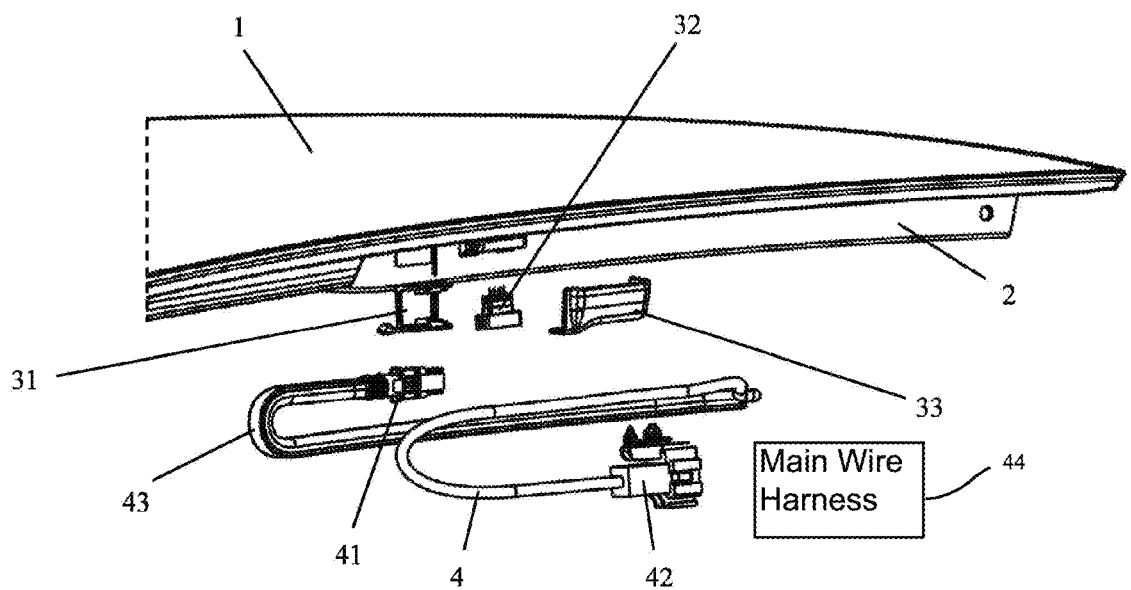
FIG. 2 is an enlarged schematic view of the vehicle sunroof in FIG. 1 at the movable harness connection.
Figure 3:
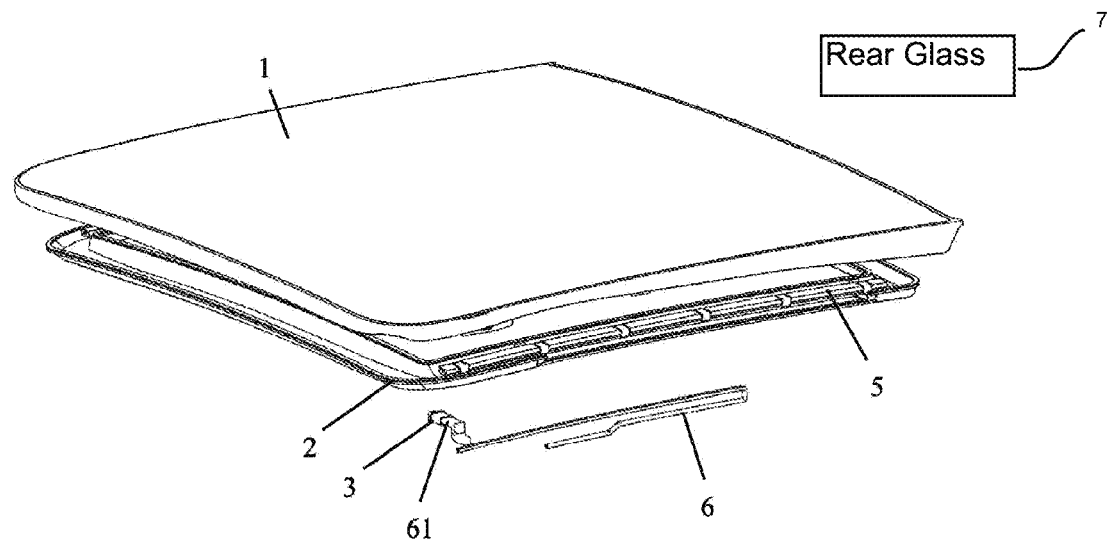
FIG. 3 is a partially exploded schematic view of an embodiment of the vehicle sunroof comprising energized sunroof glass according to the present disclosure, the control circuit of the energized front glass of the vehicle sunroof using a movable harness structure.
Figure 4:
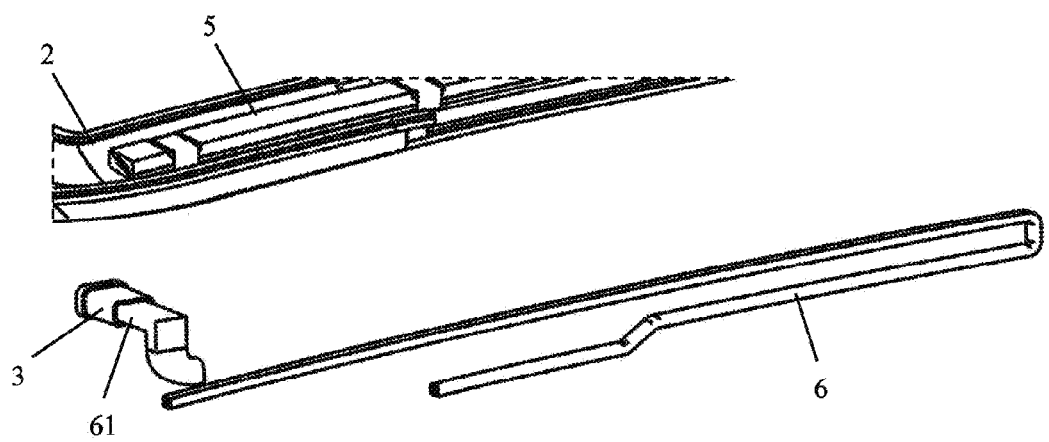
FIG. 4 is an enlarged schematic view of the vehicle sunroof in FIG. 3 at the movable harness connection.

FIG. 3 is a partially exploded schematic view of an embodiment of the vehicle sunroof comprising energized sunroof glass according to the present disclosure, the control circuit of the energized front glass of the vehicle sunroof using a movable harness structure. FIG. 4 is an enlarged schematic view of the vehicle sunroof in FIG. 3 at the movable harness connection.

It is to be noted that in the vehicle sunroof shown in FIGS. 3 and 4, the energized sunroof glass is a sunroof glass with an atmosphere light system. More specifically, both the front glass 1 and the rear glass 7 (not shown) are installed with an atmosphere light system and provided with an independent power supply structure, respectively. In other words, a front glass power supply wire harness and a rear glass 7 power supply wire harness are introduced from a main wire harness 44 of the vehicle sunroof, the front glass power supply wire harness is inserted into the socket outlet of the front glass 1 by means of a plug at one end thereof to supply power to the front glass 1, the rear glass power supply wire harness is inserted into the socket outlet of the rear glass 7 by means of a plug at one end thereof to supply power to the rear glass 7, wherein the front glass power supply wire harness is a movable wire harness 6, the movable wire harness 6 is rolled up or spread along with the movement of the front glass 1, so that the front glass 1 remains electrically connected during the entire process of opening and closing.

As shown in FIGS. 3 and 4, the atmosphere light system mounted on the front glass 1 comprises LED (light-emitting diode) light strips 5 mounted along two side edges of the front glass 1 and ring-shaped atmosphere light shades 2 configured to cover the LED light strips 5, the atmosphere light shade 2 being provided with a socket outlet 3 configured to be connected to the movable wire harness 6, the socket outlet 3 and the atmosphere light shade 2 are preferably integrally formed. The socket outlet 3 is disposed, for example, proximal to the front end of the LED light strip, and provided with an electrical connector disposed therein and configured to electrically connect the LED light strip 5 to the movable wire harness 6.

when the glass end plug 61 of the movable wire harness is inserted into the socket outlet 3, the LED light strip 5 is connected to the movable wire harness 6 by means of the electrical connector to obtain power supply from the main wire harness 44 of the sunroof. Compared to prior art connector assembly, the socket outlet 3 of the present disclosure is arranged without the need for a socket outlet retainer and a protective cover, and therefore has structural simplicity and higher integration.

Figure 5:
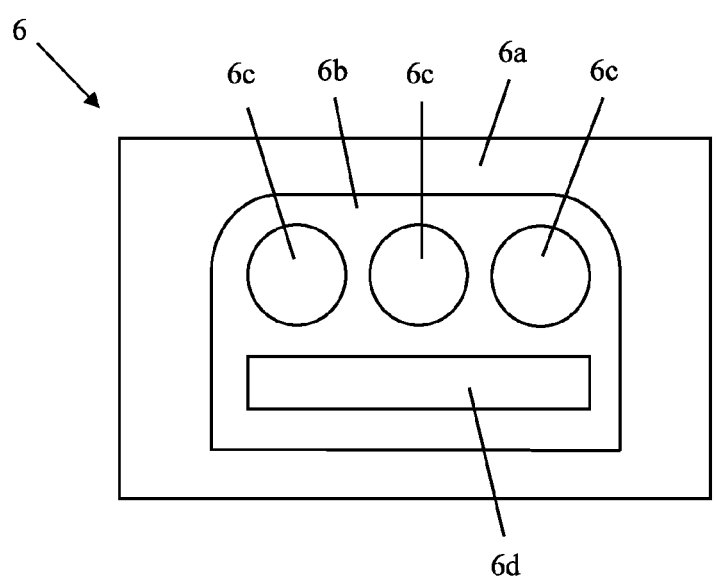
FIG. 5 is a cross-sectional schematic of the movable wire harness of the vehicle sunroof shown in FIGS. 3 and 4.

FIG. 5 is a cross-sectional schematic of the movable wire harness 6 of the vehicle sunroof shown in FIGS. 3 and 4. As shown in the cross-sectional view, the movable wire harness 6 comprises an outer protective layer 6a, an inner protective layer 6b, a plurality of wires 6c disposed inside the inner protective layer 6b, and a hard guiding member 6d. The quantity of the wires 6c is at least two (three are exemplarily shown in the figure), wherein at least an anode wire and a cathode wire are included for electrical conduction, and the wires may further include at least a signal wire for signal transmission.

The hard guiding member 6d is, for example, a metal sheet (such as spring steel) or hard plastic sheet. The hard guiding member 6d penetrates through at least part of the length of the movable wire harness 6, preferably through the entire length of the movable wire harness 6. Due to the presence of the hard guiding member 6d, the movable wire harness 6 can have a relatively high strength without the provision of a harness sleeve, therefore the movable wire harness 6 has a good self-guiding function when the front glass slides and is not easy to get tangled during the process of being rolled up or spread.

Preferably, the movable wire harness 6 has a roughly rectangular cross-section and the plurality of wires 6 are arranged on one side of the hard guiding member 6*d*. Compared to a wire harness with a roughly circular or square cross-section, for the length-width difference of the movable wire harness 6 (i.e. the movable wire harness 6 has a flat shape), the torsional rigidity of the movable wire harness 6 is optimized, and the movable wire harness 6 is more stable when being spread and rolled up.

Further, as the presence of the hard guiding member 6*d* meets the strength requirements of the movable wire harness 6, the movable wire harness 6 has a smaller external cross-sectional area than those of prior art wire harnesses. For example, the roughly rectangular cross-section of the outer protective layer 6*a* has a length of approximately 5.0~6.0 mm and a width of approximately 3.5~4.0 mm, the roughly rectangular cross-section of the inner protective layer 6*b* has a length of approximately 3.0~4.0 mm and a width of approximately 2.0~2.5 mm. In fact, if the material of the hard guiding member 6*d* provides adequate strength, the movable wire harness 6 can be designed to have only one protective layer so as to further reduce the external cross-sectional dimensions of the movable wire harness 6.

Due to the reduction in the external cross-sectional dimensions of the movable wire harness 6, the sizes of the socket outlets at both ends of the movable wire harness 6 are correspondingly reduced. Given that the size of the glass end socket outlet 61 of the movable wire harness 6 is reduced, the size of the socket outlet 3 disposed on the atmosphere light shade 2 is correspondingly reduced. It can therefore be seen that the size of the entire movable harness structure is optimized.

Of course, the energized sunroof glass of the vehicle sunroof according to the present disclosure is not limited to the sunroof glass with atmosphere light system described above, and in particular, the energized sunroof glass may be dimming glass or solar glass.

While the technical content and technical features of the present disclosure have been disclosed above, it will be understood that persons skilled in the art may make modification and improvement to the disclosed concept based on the fundamental idea of the present disclosure, and such modification and improvement shall fall within the scope of protection of the present disclosure.

The foregoing description is exemplary and not restrictive, and the scope of protection of the present disclosure shall be as defined by the appended claims.

What is claimed is:

1. A vehicle sunroof including an energized sunroof glass having a front glass configured to be slidable relative to a rear glass, the vehicle sunroof comprising:
    a movable wire harness, one end of the movable wire harness being electrically connected to the front glass, and the other end of the movable wire harness being configured to be electrically connected to a main wire harness of the vehicle sunroof; and
    a hard guiding member disposed inside the movable wire harness,
    wherein two or more wires are disposed in an inner protective layer and the hard guiding member and the two or more wires are surrounded by an outer protective layer,
    wherein the hard guiding member is a metal sheet or a hard plastic sheet and penetrates through the entire length of the movable wire harness extending between first and second plugs positioned at distal ends to guide the movable wire harness to be rolled up or spread when the front glass slides.

2. The vehicle sunroof comprising the energized sunroof glass according to claim 1, wherein the movable wire harness has a rectangular cross section with adjacent sides of unequal length, and wherein a plurality of wires are arranged at one side of the hard guiding member.

3. The vehicle sunroof comprising the energized sunroof glass according to claim 1, wherein the energized sunroof glass is a sunroof glass with an ambience light system, and wherein the ambience light system comprises an LED strip installed along an edge of the front glass and an ambience light cover configured to cover the LED strip, and wherein the ambience light cover is provided with a socket configured to electrically connect the LED strip to the movable wire harness.

4. The vehicle sunroof comprising the energized sunroof glass according to claim 3, wherein the socket is integrally formed with the ambience light cover.

5. The vehicle sunroof comprising the energized sunroof glass according to claim 1, wherein the energized sunroof glass is a dimming glass or a solar glass.

6. A vehicle comprising the vehicle sunroof comprising the energized sunroof glass according to claim 1.

7. The vehicle sunroof comprising the energized sunroof glass according to claim 1, wherein the hard guiding member is disposed in the inner protective layer.

* * * * *

UNITED STATES PATENT AND TRADEMARK OFFICE
CERTIFICATE OF CORRECTION

Page 1 of 1

PATENT NO. : 12,427,938 B2
APPLICATION NO. : 17/802821
DATED : September 30, 2025
INVENTOR(S) : Xiong Liu et al.

It is certified that error appears in the above-identified patent and that said Letters Patent is hereby corrected as shown below:

On the Title Page

In The Abstract:
Item (57), Line 13, "from glass (1)" should be --front glass (1)--.

In the Specification

Column 4, Line 8, "7 (not shown) are" should be --7 are--.

Signed and Sealed this
Twenty-fifth Day of November, 2025

John A. Squires
*Director of the United States Patent and Trademark Office*